Figure 1:
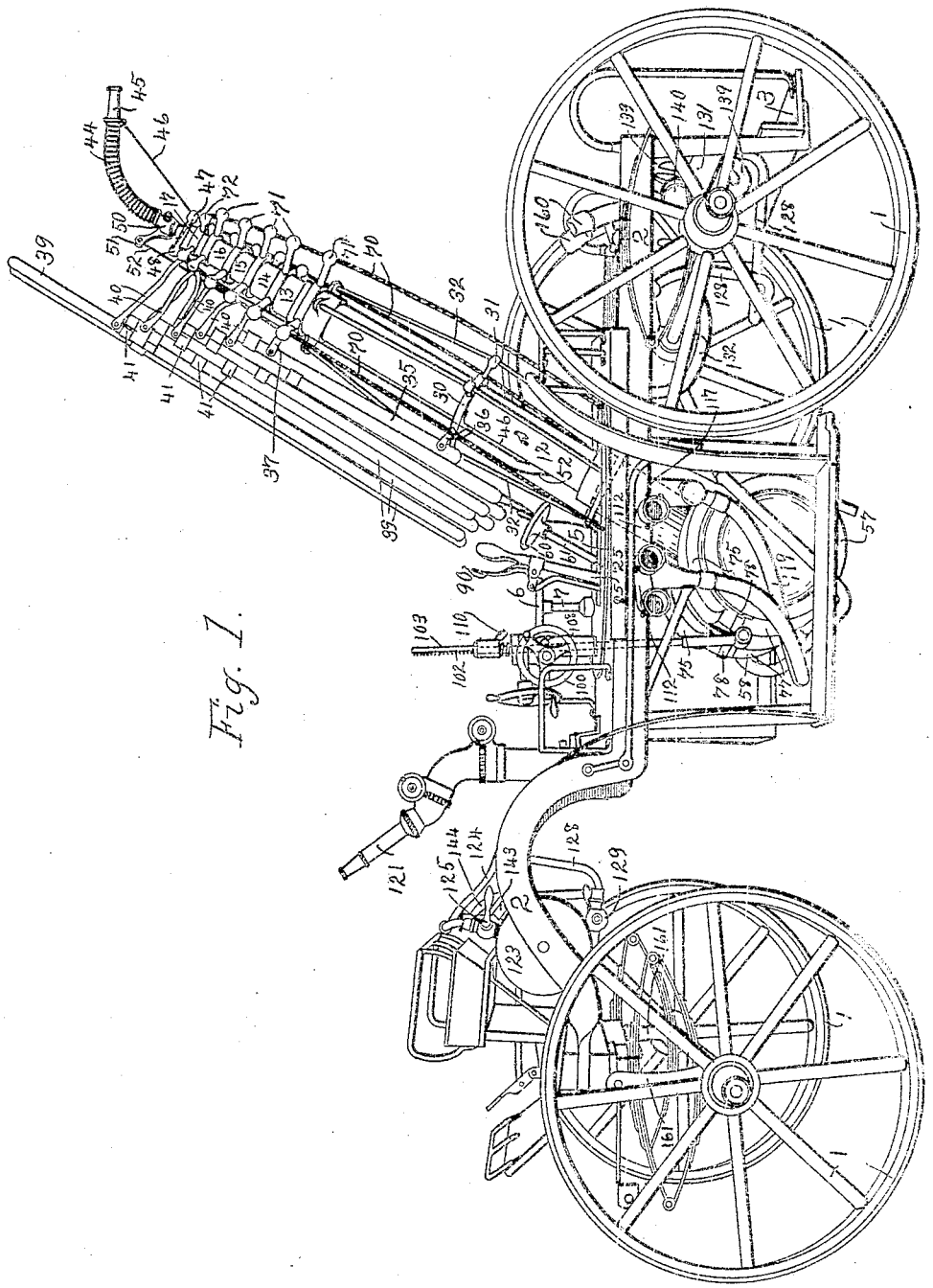

No. 786,687. PATENTED APR. 4, 1905.
H. SEKOWSKY.
EXTENSIBLE WATER TOWER.
APPLICATION FILED FEB. 15, 1904.

5 SHEETS—SHEET 1.

WITNESSES: INVENTOR.
Hermann Sekowsky
BY
ATTORNEYS.

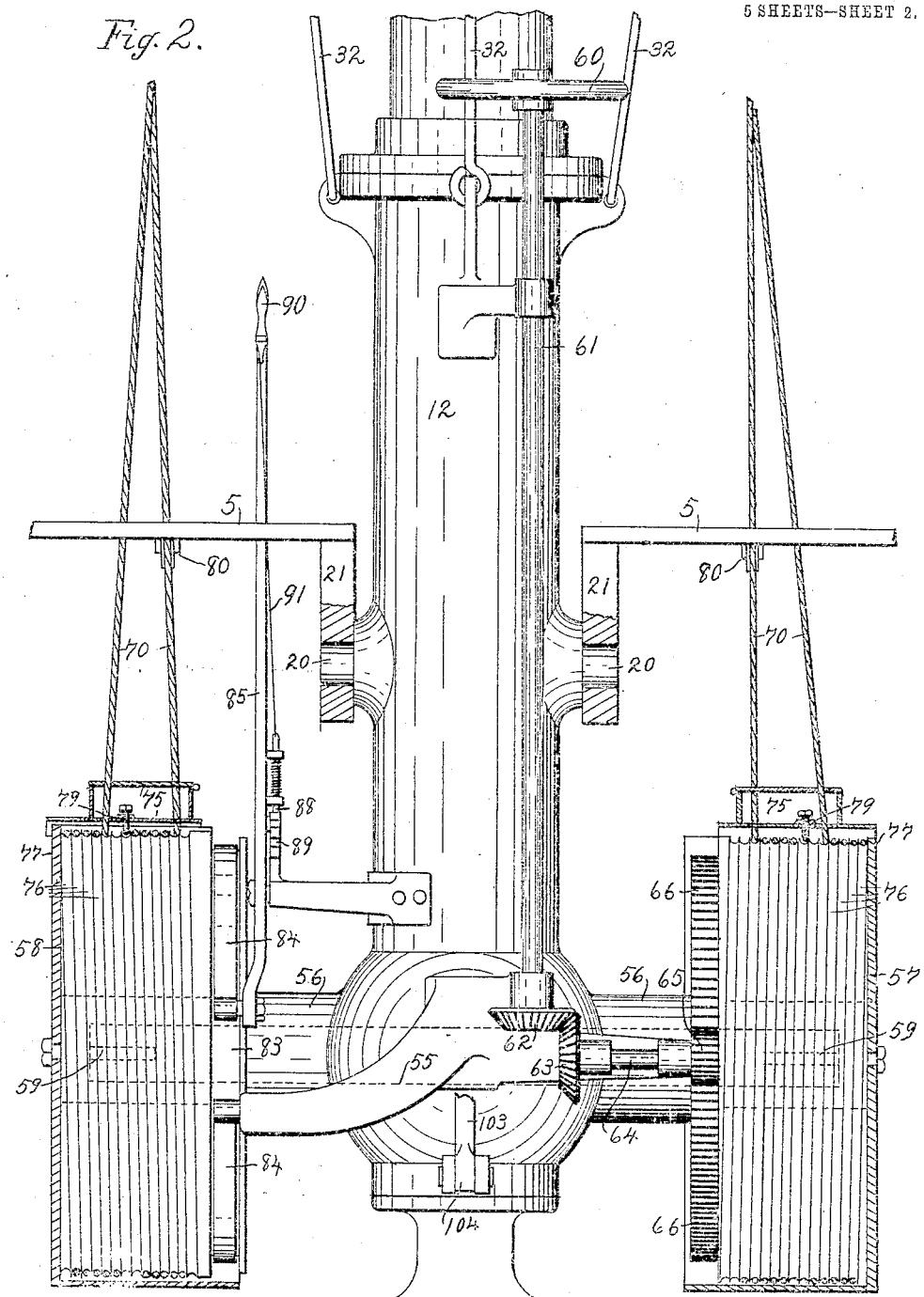

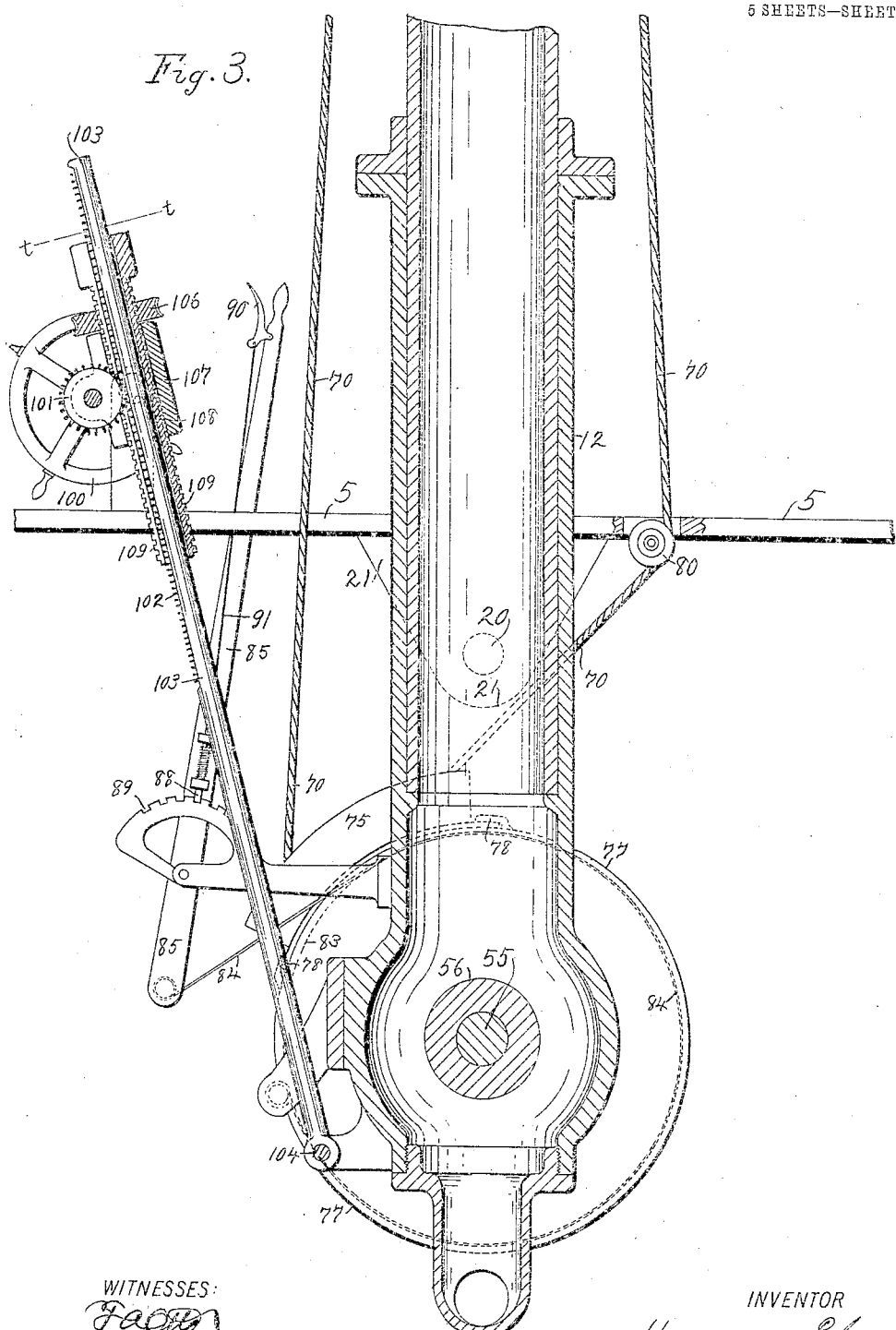

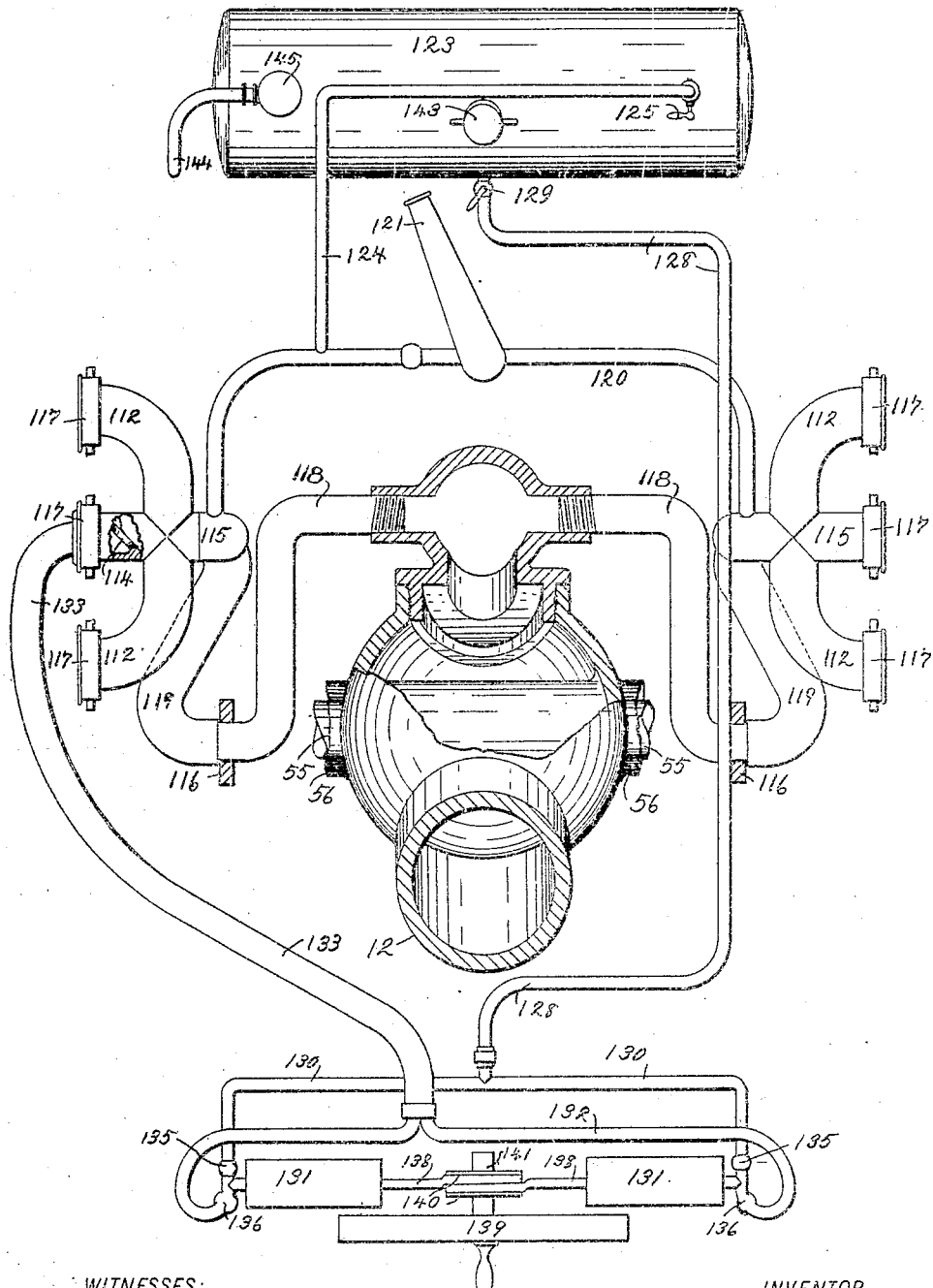

No. 786,687. PATENTED APR. 4, 1905.
H. SEKOWSKY.
EXTENSIBLE WATER TOWER.
APPLICATION FILED FEB. 15, 1904.
5 SHEETS—SHEET 5.
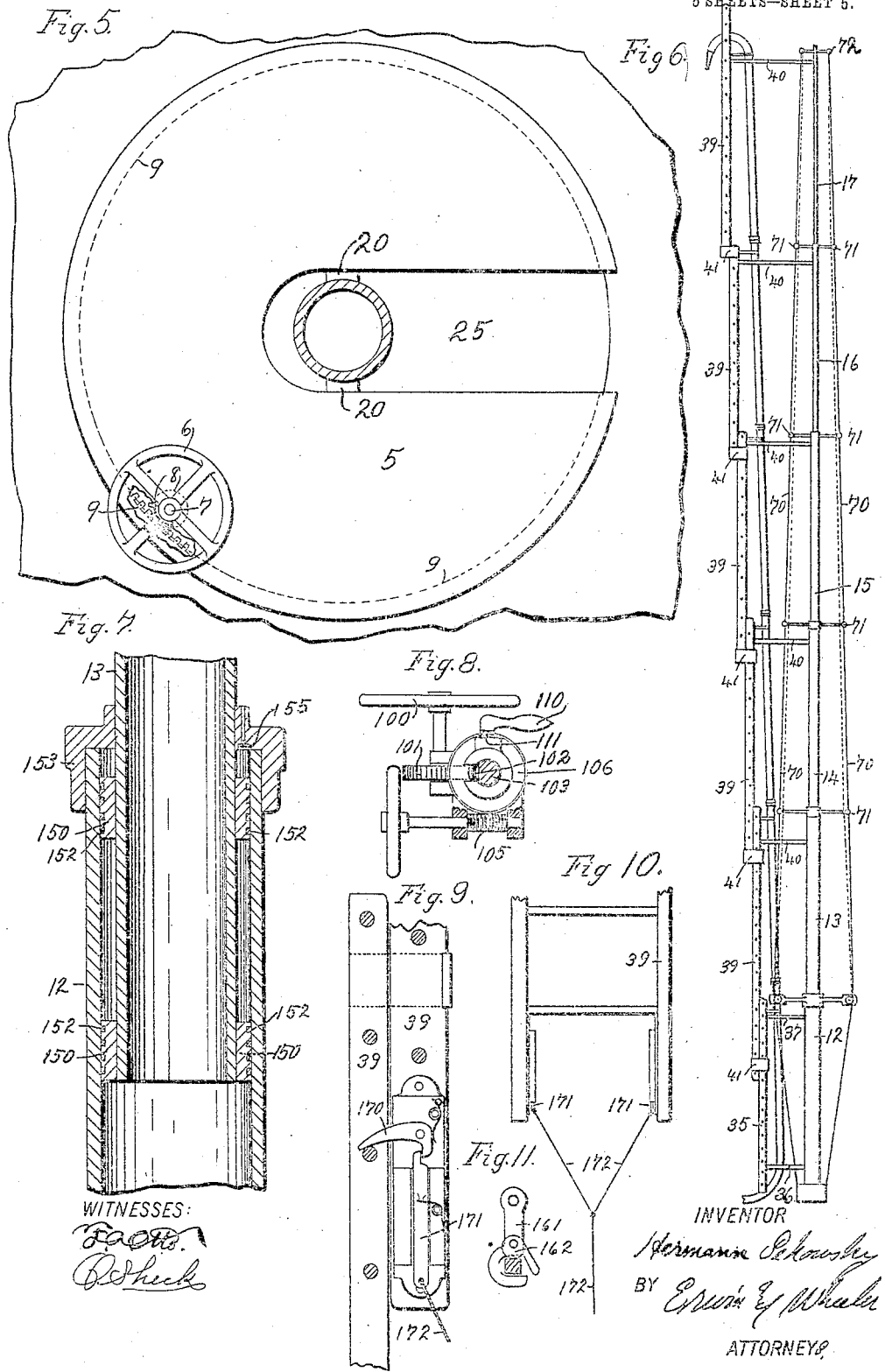
WITNESSES:
INVENTOR
Hermann Sekowsky
BY Erwin E. Whaler
ATTORNEYS No. 786,687.

Patented April 4, 1905.

UNITED STATES PATENT OFFICE.

HERMANN SEKOWSKY, OF MILWAUKEE, WISCONSIN.

EXTENSIBLE WATER-TOWER.

SPECIFICATION forming part of Letters Patent No. 786,687, dated April 4, 1905.

Application filed February 15, 1904. Serial No. 193,492.

*To all whom it may concern:*

Be it known that I, HERMANN SEKOWSKY, a citizen of the United States, residing at Milwaukee, county of Milwaukee, and State of Wisconsin, have invented new and useful Improvements in Extensible Water-Towers, of which the following is a specification.

My invention relates to improvements in extensible water-towers.

The objects of my invention are, first, to provide means for supporting the tower laterally in any desired position of adjustment, whereby it is not only supported against its own weight and that of the water, but is rendered sufficiently rigid to support ladders and firemen thereon who are thus enabled to reach the top of the tower and direct a stream of water into a burning building either through a terminal nozzle connected with the tower or through auxiliary hose; second, to provide the tower with ladder-sections which will be automatically extended as the tower is lifted; third, to provide means for moving and controlling the movement of the tower to various angles and positions, and, fourth, to provide means for utilizing a chemical fire-extinguishing compound to not only lift the tower, but to extinguish the fire in some cases before the ordinary water-supply can be made available.

My invention also has in view certain structural improvements hereinafter described and claimed.

In the following description reference is had to the accompanying drawings, in which—

Figure 1 is a perspective side view of my invention. Fig. 2 is a detail front view showing the lower end of the stand-pipe and the winding-drums for the stays. Fig. 3 is a detail side view of the same parts shown in Fig. 2 so far as the same are visible from the side, also showing means for regulating the inclination of the stand-pipe. Fig. 4 is a detail plan view of the chemical-supply and water connections, also showing the lower end of the stand-pipe tilted and in axial section. Fig. 5 is a plan view of the turn-table from which the stand-pipe is pivotally supported, said turn-table being partially broken away to show the connections for operating the same. Fig. 6 is a diagrammatic view of the stays, illustrating their relation to the arms of the stand-pipe sections. Fig. 7 is a detail sectional view of the packing of two interacting stand-pipe sections. Fig. 8 is a cross-section of the mechanism for tilting the stand-pipe drawn on line $t\,t$ of Fig. 3. Figs. 9 and 10 are detail views of the ladder-locking mechanism. Fig. 11 is a detail view of the link 161.

Like parts are identified by the same reference characters throughout the several views.

The various parts of the apparatus are mounted upon a vehicle, of which 1 are the wheels, and 2 the frame. The vehicle is provided with a rear step 3, as is usual in connection with fire-department apparatus. The central portion of the vehicle-frame is provided with a turn-table 5, mounted in suitable bearings in the frame and operated by means of a hand-wheel 6, from which motion is communicated to the turn-table through the medium of the shaft 7, pinion 8, and circular rack 9. The stand-pipe is formed in sections 12, 13, 14, 15, 16, and 17, progressively of smaller size and arranged to telescope within each other. The lower section 12 of the stand-pipe is provided with pivot-trunnions 20, mounted in suitable brackets 21, depending from the turn-table on opposite sides of the section 12. The turn-table is provided with an elongated aperture 25, extending rearwardly and at right angles to the axes of the trunnions 20 from the stand-pipe section 12, preferably in the form of an open-ended slot cutting the marginal edge of the turn-table. The aperture 25 also extends in front of the section 12 to a limited extent, so that the stand-pipe is permitted to tilt freely upon the pivot-trunnions 20 and may be depressed rearwardly to a considerable extent when the apparatus is not in use. The central portion of the section 12 is provided with a ring 30, having outwardly-projecting arms 31, through which truss-rods 32 are passed and connected at their respective ends to the upper and lower portions of the section 12, thus reinforcing said section at its central portion and providing a support for the lower section 35 of an extension-ladder, which is automatically extended when the stand-pipe is elevated. The lower end of the ladder-section 35 is supported from the ring 30 by means of yoke-arms 36. The upper end of said section 35 is similarly supported from the upper end of the section 12 by yoke-arms 37. The other ladder-sections, each of which is designated by a reference character 39, are each connected at their upper ends with a corresponding section of the stand-pipe by yoke-arms 40, projecting from the upper end of such stand-pipe section. Each ladder-section near its upper end is provided with guide-brackets 41, loosely engaging the side rails of the next ladder-section, which is permitted to slide in the brackets when the ladder is adjusted. The upper section 17 of the stand-pipe is provided with a flexible hose 44, which may be bent for the purpose of directing the nozzle 45 by means of a cord, wire, or other flexible connection 46, attached to the nozzle and extending through suitable guides 47 and 48 and downwardly to the lower end of the stand-pipe. A valve located at 50 controls the delivery of water through the section 44 and the nozzle, this valve being operated by means of an arm 51 and a flexible connection 52, the latter also extending downwardly to the lower end of the stand-pipes.

Referring to Figs. 2 and 3, it will be observed that the lower end of the stand-pipe section 12 is provided with a tubular aperture extending therethrough on a line parallel with the axes of the trunnion 20. A shaft 55 extends through this aperture and outwardly in sleeve-bearings 56, winding-drums 57 and 58 being mounted upon the ends of the shaft, which project from the sleeves 56 and are keyed to the drums, as indicated at 59 in Fig. 2. These winding-drums may be actuated by hand through the medium of a hand-wheel 60, rod 61, bevel gear-wheels 62 and 63, shaft 64, pinion 65, and gear-wheel 66, the latter being rigidly connected with the drum 57. The peripheries of the drums are suitably grooved for the reception of stays 70, which stays extend upwardly from the drum through suitable apertures in truss-arms 71, connected with each of the stand-pipe sections, the upper ends of the stays being attached to truss-arms 72 of the upper stand-pipe section. Guides 75 are used to prevent the stays from being disarranged on the drum, and grooves 76 are spirally formed in the drums, whereby the stays are made to wind progressively upon the drums without crossing. The guides 75 are loosely mounted upon the casings 77 of the drums and are movable laterally on the drum-casings in brackets 78, one of these brackets being located at each end of each guide 75. A finger 79 projects from each guide into a groove 76 of the corresponding drum, whereby the guide 75 is moved laterally when the drum is rotated, each revolution of the drum causing a movement of the guide equal to the distance between successive turns of the stays 70 in the groove. As the stays are passed through suitable apertures in the guide 75, it is obvious that the position of the latter absolutely controls the winding of the stays and compels such stays to follow the groove in the drum. The finger 79 preferably consists of a screw, whereby it may be adjusted to the proper position in the groove 76. Each of the arms 71, through which the stays pass, extends at right angles to the two adjacent arms on the same stand-pipe section, so that the stays are made to support the stand-pipe at points substantially ninety degrees distant from each other, there being four stays employed in the construction shown. The rear stays are made to pass over suitable guide-pulleys 80, whereby the direction is changed at the lower end and the stays permitted to wind upon the drum in the same direction as the two front stays. It will be observed, Fig. 6, that the arms 71 on the successive stand-pipe sections do not hold the stay in a straight line parallel with the axis of the stand-pipe, but that the stay is pressed outwardly by the arms 71, so that when tension is exerted upon the stay it will press forcibly inward upon each of the arms, and thereby reinforce the stand-pipe throughout its length. The several stays taken with the arms 71 constitute a truss. The stays are unwound from the drums automatically when the stand-pipe sections are elevated; but when such sections are depressed the stays are rewound upon the drums by means of the hand-wheel 60, as above described.

The drum 58 is provided with a hub 83, having a band-brake 84, which may be set by means of an operating-lever 85, connected with one end of the brake. The lever may be locked in any desired position of adjustment by means of a latch 88, engaging a toothed sector 89, and operated by a thumb-lever 90, connected with the latch by a wire 91. When the brake is set, the upward pressure of the stand-pipe will be exerted upon the stays 70, and the tension of the latter will then serve to steady the stand-pipe.

The weight of that portion of the lower stand-pipe section below the trunnions 20, together with the weight of the drums, which are supported from the section 12 by the shaft 55, is sufficient to hold the stand-pipe in any desired raised position when extended and filled with water. It is also sufficient to support the weight of the ladders, firemen, and auxiliary hose connected with or carried up the ladders by the firemen. Normally the stand-pipe would therefore be held in a vertical position. It is, however, tilted upon the trunnions 20 through the medium of a hand-wheel 100, pinion 101, rack 102, and rack-bar 103, the latter being pivotally connected to the lower end of the section 12 at 104. The hand-wheel 100 is, however, used only for a rapid adjustment of the stand-pipe. For a slower and more exact adjustment a worm-shaft 105 is employed, Figs. 3 and 8, which actuates the rack-bar 103 through the medium of the worm-wheel 106. The latter is provided with a central aperture, through which the rack-bar 103 passes, the wheel 106 having an internal worm or thread engaging the teeth of a tubular screw 109, connected with the rack 102, whereby the motion of the wheel 106 is transmitted to the rack-bar. The rack-bar extends through a guide 107, pivoted at 108 to the turn-table, and the actuating mechanism of the rack-bar is mounted on this guide. A brake-lever 110 is employed to hold the rack-bar 103 and the stand-pipe in any desired position of adjustment. The lever is connected with a set-screw 111, entered in a screw-threaded aperture in the guide 107 and which serves as a brake, being arranged to engage the rack-bar when the lever 110 is turned in one direction, whereby the bar 103 is securely locked against further independent movement. When the stand-pipe is to be adjusted by means of the worm-wheel 106 and its actuating-shaft, the brake-lever 110 is used to lock the tubular screw 109 to the bar 103; but when the stand-pipe is to be adjusted by gravity or by the wheel 100 the brake is released, thus permitting the bar 103 to slide freely in the screw 109 and avoiding unnecessary friction in the worm-gear. When the stand-pipe is tilted and it is desired to raise it to a perpendicular position, it is merely necessary to release the brake by lifting the lever 110. The weight of the parts below the trunnions 20 will then cause the stand-pipe to swing toward a vertical position, the set-screw brake 111 being applied when the desired position of elevation is approximately reached. When the brake 111 is released, the actuating connections of the rack-bar are free to turn with the downward movement of the rack-bar as the stand-pipe approaches a vertical position. The movement of the stand-pipe may, however, be controlled by the operator through the medium of said actuating connections without setting the brake until the desired adjustment is attained.

Referring to the fluid-supply connections, (best illustrated in Fig. 4,) it will be observed that the sides of the vehicle-frame are provided with coupling-pipes 115, preferably provided with branches 112, each of the pipes 115 and branches 112 being provided with suitable hose-couplings 117 and check-valves 114, arranged to prevent outward flow. Each of the pipes 115 is connected by a flexible hose 119 with the elbowed end of a pipe 118, the elbow being journaled in the axial line of the trunnions 20 in brackets 116, connected with the turn-table. The inner end of each pipe 118 is connected to the lower end of the stand-pipe and permits the stand-pipe and turn-table to oscillate without disengaging the supply connections. In the construction shown there are six hose-couplings 117, to all of which lines of hose may be connected to supply water to the tower. The pipes 115 on the respective sides of the vehicle are connected by a cross-pipe 120, which is provided with a valve-controlled adjustable nozzle 121 of any ordinary construction. A chemical-supply tank 123 is also connected with the pipe 120 by a pipe 124, having a hand-controlled valve at 125. By opening the valve 125 the chemical-tank is thus placed in communication with the stand-pipe through both of the pipes 115 and their connections above described. The chemical-tank is also in communication with a pump through the medium of a pipe 128, having a valve at 129, and a cross-pipe 130, which in the construction shown supplies two pump-cylinders 131. The pump-cylinders discharge through a cross-pipe 132 into a pipe 133, which is coupled to one of the pipes 115 when the pump is in use. Suitable check-valves at 135 and 136 are employed to control the supply and discharge of liquid from the pump-cylinders. The piston-rods 138 of the respective pumps are manually operated by a crank-wheel 139 and cams 140, mounted on the shaft 141 of the crank-wheel.

143 is a cap for the filling-aperture of the chemical-tank, and 144 is a vent-pipe having an ordinary inwardly-opening check-valve at 145, permitting the escape of air, but preventing the escape of liquid.

A heavy pressure of the liquid is required to extend the tower and support the weight of apparatus and operators, and I have therefore provided the tower-sections with packing, as shown in Fig. 7. The lower end of each movable pipe-section is provided with rings 150, having an intervening air-space. Each ring is provided with grooves filled with compressible packing 152. The upper end of the inclosing section is provided with a cap 153, against which the upper ring 150 abuts when its corresponding section is fully elevated. A downwardly-opening check-valve 155 permits the free passage of air through the cap 153, but being close to its seat closes and prevents the escape of any water which may pass the other packing. This valve is of the same character as the vent-valve 145 of the chemical-tank. It will be understood that any water leaking past the lower ring 150 will tend to compress the air between the rings, and thus develop a partial back pressure which will be effective to prevent further leakage.

When not in use, the stand-pipe is lowered and tilted until it contacts with rests 160, Fig. 1, at the rear end of the vehicle, the hand-wheel 100 being actuated to thus tilt the stand-pipe and the screw-brake, Fig. 3, being set to hold the parts in this position. When the apparatus is to be used, the screw-brake is released and the weight of the drums 57 and lower end of the section 12 tilts the stand-pipe toward a vertical position, the screw-brake being again applied as soon as the desired angle is attained. The stand-pipe sections are then extended, either by water-pressure entering through the pipes 115 by chemical liquids and gases from the tank 123 or by liquid from said tank pumped into the standpipe from the cylinders 131. The chemical-pressure and the pump are used to elevate the stand-pipe before water connections can be made. The exact desired inclination of the stand-pipe is then secured by operating the worm-shaft 105, and the turn-table is oscillated to swing the stand-pipe laterally. When the stand-pipe is being elevated, the brake-lever 85 is actuated to apply the friction band-brake 84 to the drums, thus applying tension to the truss-stays. When the stand-pipe is lifted to the desired height, the brake 84 is applied with increased tension to stop the movement of the drums, when the stand-pipe will be held in a fixed position, and when properly adjusted and the nozzle directed at the desired angle the valve at 51 is opened to permit the liquid to discharge through nozzle 45. The end area of each pipe-section is such that the water-pressure will hold it in raised position when the valve 51 is open. To lower the stand-pipe, liquid is permitted to escape by manually opening the check-valve in one of the pipes 115 or its branches, the supply being cut off. The hand-wheel 60 and rod 61 are then turned to rewind the stays upon the drum while the stand-pipe is descending. The movement of the ladders is entirely automatic in both directions. When the stand-pipe is in use, it is desirable that it should be maintained as nearly rigid as possible, and as the pulsations of water pumped by the engines tends to cause vibrations in the vehicle-springs which would cause the elevated stand-pipe to sway I have provided links 161, pivoted to the vehicle-frame and adapted to engage the axle-shafts. A clamping cam-lever 162 binds the link to the axle-shaft, the latter thus providing a rigid connection with the frame which prevents the springs from vibrating during the operation of the apparatus.

Referring to Figs. 9 and 10, it will be seen that each ladder-section is provided with pivotal spring-actuated catches 170, normally projecting between the rings of the adjacent ladder-section. A spring-controlled locking-bar 171 normally holds each catch against downward movement, but will release the catch when pulled downwardly by means of flexible connection 172. The ladder-sections are thus automatically locked by means of the catches in any position of extension and released manually when their retraction is desired. The guide-boxes 75 are preferably filled with grease, which covers the stays and keeps them from freezing.

Having thus described my invention, what I claim as new, and desire to secure by Letters Patent, is—

1. In a device of the described class, a standpipe comprising a series of telescoping sections; a set of flexible stays uniformly disposed about the stand-pipe at substantially equal intervals and arranged to reinforce the stand-pipe on all sides, said stays being connected with the stand-pipe near its top and bottom and loosely connected therewith at intervening points; and means for taking up and letting out said stays equally, the pull of the several stays upon all sides of the pipe being balanced.

2. In a device of the described class, a standpipe comprising a series of telescoping sections; a set of flexible stays uniformly disposed about the stand-pipe at substantially equal intervals and arranged to reinforce the stand-pipe on all sides, said stays being connected with the stand-pipe near its top and bottom and loosely connected therewith at intervening points; winding mechanism for taking up said stays; and means for maintaining any desired tension on said stays during the extension of the stand-pipe.

3. In a device of the described class, a standpipe comprising a series of telescoping sections; a set of flexible stays having fixed connection with the stand-pipe near its upper end; winding mechanism supported from the lower section and operatively connected with the stays; and laterally-projecting arms on each stand-pipe section, having sliding engagement with the stays; each stay being arranged and adapted to counteract the lateral pull of one or more of the others upon the stand-pipe.

4. In a device of the described class, the combination with an extensible stand-pipe; of flexible stays connected therewith; winding-drums operatively connected with the stays; means for actuating the winding-drums and means for checking the movement of the drums at the will of the operator, whereby tension may be applied to the stays at any time during the extension of the stand-pipe, said stand-pipe having supporting-arms of different lengths loosely engaging the stays and holding the same in a position of radial deflection from a straight line.

5. In a device of the described class, the combination with an extensible stand-pipe; of flexible stays connected therewith; winding-drums operatively connected with the stays; means for actuating the winding-drums; and means for checking the movement of the drums at the will of the operator, whereby tension may be applied to the stays at any time during the extension of the stand-pipe, said stand-pipe having supporting-arms of different lengths loosely engaging the stays and holding the same in a position of radial deflection from a straight line, and said stays being arranged to coöperate to form a truss.

6. In a device of the described class, a standpipe comprising a series of telescoping sections, a set of laterally-projecting arms on each section, equidistant from each other; each such arm being diametrically opposed to one other arm of such section; a set of flexible stays connected with the stand-pipe near its upper and lower ends and loosely connected with said arms; and means for taking up and letting out said stays equally; said stays and arms being arranged to support the stand-pipe on all sides equally.

7. In a device of the described class, the combination with an extensible stand-pipe formed in telescoping sections, of a set of flexible stays having fixed connection with the upper stand-pipe section and loose connection with each of the other sections; and means for applying tension to said stays at any desired point of stand-pipe extension; together with a set of ladders, one connected with each stand-pipe section and having sliding connection with each other; and a set of auxiliary pipe-sections, one on each ladder-section, and means for connecting and disconnecting such pipe-sections.

8. In a device of the described class, the combination with an extensible stand-pipe formed in telescoping sections, of a set of flexible stays having fixed connection with the upper stand-pipe section and loose connection with each of the other sections; and means for applying tension to said stays at any desired point of stand-pipe extension; together with a set of ladders, one connected with each stand-pipe section and having sliding connection with each other; and a set of auxiliary hose, each connected to a ladder-section and adapted to be connected with each other.

9. In a device of the described class, the combination with an extensible stand-pipe formed in telescoping sections; of a turn-table supporting said stand-pipe and having pivotal connection with the lower section above the lower end of said section; of a set of flexible stays extending through the turn-table and having fixed connection with the upper stand-pipe section and loose connection with each of the other sections, said stays being arranged to draw with equal tension on all sides of the stand-pipe; and means for applying tension to said stays at any desired point of stand-pipe extension.

10. In a device of the described class, the combination of a series of telescoping stand-pipe sections, each provided with a set of equidistant, laterally-projecting arms in vertical alinement with the corresponding arms of the other sections but varying in length from the lower to the upper section; a pivotal support connected with the lower section; a series of stays connected with the upper section and loosely connected, each with the arms of one vertically-arranged series, and means for lengthening and shortening said stays in correspondence with the elevation of said stand-pipe.

11. In a device of the described class, the combination with an extensible stand-pipe; of flexible stays connected therewith; winding-drums operatively connected with the stays; means for actuating the winding-drums; a chemical-supply tank having a direct valved pipe connection with the stand-pipe; and an indirect connection comprising a pump having suction and discharge ports connected with the supply-tank and with the stand-pipe respectively.

12. The combination of an apertured turn-table; a stand-pipe pivotally supported from the turn-table and extending through said aperture; a counterbalance for the lower end portion of the stand-pipe, adapted to normally hold the same in raised position; and manually-controlled means for actuating the stand-pipe in opposition to the weight of the counterbalance.

13. The combination of a stand-pipe, mounted upon a suitable pivotal support; a counterbalance for the lower end portion of the stand-pipe adapted to normally hold the same in a raised position; and mechanism for actuating the stand-pipe in opposition to the weight of the counterbalance.

14. The combination of an apertured turn-table; a stand-pipe extending through the aperture in the turn-table and pivotally supported from the turn-table at a point below the latter; a counterbalance for the lower end portion of the stand-pipe adapted to normally hold the same in raised position; and manually-controlled means for actuating the stand-pipe in opposition to the weight of the counterbalance.

15. In a device of the described class, the combination with an extensible stand-pipe formed in telescoping sections; of a pivotal support for the lower stand-pipe section; winding-drums supported from the lower stand-pipe section below the pivotal support and stays coiled upon said winding-drums and connected with the upper portion of the stand-pipe, together with means for turning the pivotal stand-pipe support, a guide for said stays connected with said support.

16. In a device of the described class, the combination with an extensible stand-pipe formed in telescoping sections; of a pivotal support for the lower stand-pipe section; winding-drums supported from the lower stand-pipe section below said pivotal support; and stays coiled upon said winding-drums and connected with the upper portion of the stand-pipe; together with means for tilting the stand-pipe on its pivotal support in opposition to the weight of the winding-drums; said drums and other parts below the pivot, being of sufficient weight to hold the stand-pipe in raised position.

17. In a device of the described class, the combination with a turn-table, of an extensible stand-pipe formed in telescoping sections; a pivotal support for the lower stand-pipe section; winding-drums supported from the lower stand-pipe section below the pivotal support; stays coiled upon said drums and extending through apertures in the turn-table to the top of the stand-pipe; said stays having fixed connection with the upper portion of the stand-pipe and arranged to diverge downwardly therefrom on all sides of the pipe to said turn-table; and arms connected with the stand-pipe at intermediate points and loosely engaging said stays.

18. In a device of the described class, the combination with a turn-table, of a stand-pipe formed in telescoping sections; with the lower section pivotally mounted on said turn-table; stays connected with the stand-pipe above and below said turn-table and stand-pipe pivots; and means for lengthening and shortening said stays in correspondence with the length of the stand-pipe; said stays being arranged to converge above and below said turn-table and provided with connections with each stand-pipe section.

19. In a device of the described class, the combination of a tilting stand-pipe formed in telescoping sections; a set of winding-drums connected with said stand-pipe; flexible stays coiled upon said winding-drums and guided to opposite sides of the stand-pipe near the base thereof; said stays being extended to, and connected with, the top of the stand-pipe and arranged to support the same uniformly in all directions; and said drums being provided with suitable guides, controlling the coiling of said stays thereon, whereby the uncoiled portions of said stays are kept uniform in length.

20. In a device of the described class, the combination of an extensible stand-pipe formed in telescoping sections; a pivotal support for the lower stand-pipe section; winding-drums connected with the lower stand-pipe section; stays coiled upon said winding-drums and extending over suitable guides upwardly at equidistant intervals to the top of the stand-pipe; said stays being laterally connected with each stand-pipe section; a friction-brake controlling the movement of the winding-drums during the elevation of the stand-pipe; and mechanism for actuating the drums to rewind the stays when the stand-pipe is lowered.

21. In a device of the described class, the combination of an extensible stand-pipe formed in telescoping sections pivotally mounted upon a suitable turn-table; a guide mounted to oscillate on said turn-table; a rod pivotally connected to the stand-pipe below the connection between the latter and the turn-table and extending through said guide at right angles to the axis of its oscillation; a brake connected with the guide and adapted to engage the rod; and rod-actuating connections mounted on the guide.

22. In a device of the described class, the combination of an extensible stand-pipe formed in telescoping sections pivotally mounted upon a suitable turn-table; a guide mounted to oscillate on said turn-table; a rod pivotally connected to the stand-pipe below the connection between the latter and the turn-table and extending through said guide at right angles to the axis of its oscillation; a brake connected with the guide and adapted to engage the rod; and rod-actuating connections mounted on the guide, said actuating connections comprising rack-and-pinion mechanism.

23. In a device of the described class, the combination of an extensible stand-pipe formed in telescoping sections pivotally mounted upon a suitable turn-table; a guide mounted to oscillate on said turn-table; a rod pivotally connected to the stand-pipe below the connection between the latter and the turn-table and extending through said guide at right angles to the axis of its oscillation; a brake connected with the guide and adapted to engage the rod; and rod-actuating connections mounted on the guide, said actuating connections comprising rack-and-pinion mechanism, and also a worm-shaft engaging a worm-wheel, having an internal gear in mesh with the rack.

24. In a device of the described class, the combination of a stand-pipe, pivotally mounted on a suitable support and provided with a tubular aperture below the pivot; a shaft extending through said aperture; a set of winding-drums rigidly connected with the shaft; and flexible stays wound on the winding-drums and connected with the top portion of the stand-pipe.

25. In a device of the described class, the combination of a stand-pipe; a winding-drum connected therewith; stays coiled upon said winding-drum and connected with the upper portion of the stand-pipe; a laterally-movable guide located adjacent to the drum; and a device connected with the guide and engaged in a spiral groove on the drum, said stays being passed through suitable apertures in the guide.

In testimony whereof I affix my signature in the presence of two witnesses.

HERMANN SEKOWSKY.

Witnesses:
LEVERETT C. WHEELER,
JAS. B. ERWIN.